United States Patent
Persson et al.

(10) Patent No.: US 10,153,975 B2
(45) Date of Patent: Dec. 11, 2018

(54) METHOD FOR CONTROLLING USER PLANE TRAFFIC FLOWS IN A WIRELESS TELECOMMUNICATION NETWORK

(71) Applicant: TELEFONAKTIEBOLAGET L M ERICSSON (PUBL), Stockholm (SE)

(72) Inventors: Fredrik Persson, Märsta (SE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 212 days.

(21) Appl. No.: 14/767,648

(22) PCT Filed: Feb. 15, 2013

(86) PCT No.: PCT/SE2013/050134
§ 371 (c)(1),
(2) Date: Aug. 13, 2015

(87) PCT Pub. No.: WO2014/126516
PCT Pub. Date: Aug. 21, 2014

(65) Prior Publication Data
US 2015/0358237 A1 Dec. 10, 2015

(51) Int. Cl.
*H04L 12/803* (2013.01)
*H04L 12/801* (2013.01)
(Continued)

(52) U.S. Cl.
CPC .......... *H04L 47/125* (2013.01); *H04L 45/306* (2013.01); *H04L 47/193* (2013.01);
(Continued)

(58) Field of Classification Search
CPC ... H04W 48/16; H04W 84/045; H04W 24/02; H04W 28/0268; H04L 67/2842; H04L 45/38
See application file for complete search history.

(56) References Cited

U.S. PATENT DOCUMENTS

| 8,094,575 B1 | 1/2012 | Vadlakonda et al. |
| 2010/0034089 A1* | 2/2010 | Kovvali ............ H04L 67/2842 370/235 |

(Continued)

FOREIGN PATENT DOCUMENTS

| EP | 2291048 A1 | 3/2011 |
| EP | 2299754 A1 | 3/2011 |

(Continued)

OTHER PUBLICATIONS

Boufidis, et al., End-to-End Architecture for Adaptive Communication Systems, 2006 IEEE 64th Vehicular Technology Conference, Montreal, Quebec, Canada, Sep. 25-28, 2006, 5 pages.

*Primary Examiner* — Jung H Park
(74) *Attorney, Agent, or Firm* — Baker Botts, LLP (57) ABSTRACT

A method performed by a first network node for controlling user plane traffic flows relating to wireless devices in a wireless telecommunications network is provided. The first network node is configured to transmit the user plane traffic flows over a first transmission path to a second network node in the wireless telecommunications network. The first network node determines that a user plane traffic flow related to a wireless device is to be transmitted over a second transmission path to an intermediary network node configured to communicate with the first and second network nodes in the wireless telecommunications network based on the type of the user plane traffic flow, the wireless device related to the user plane traffic flow and/or the content of the user plane traffic flow. Then, the first network node controls the user plane traffic flow such that the user plane traffic flow is transmitted over the second transmission path to the intermediary network node in the wireless telecommunications network.

15 Claims, 7 Drawing Sheets

(51) Int. Cl.
  *H04W 48/18* (2009.01)
  *H04L 12/725* (2013.01)
  *H04W 40/02* (2009.01)
  *H04W 28/08* (2009.01)
(52) U.S. Cl.
  CPC ........... *H04W 40/02* (2013.01); *H04W 48/18* (2013.01); *H04W 28/08* (2013.01)

(56) References Cited

U.S. PATENT DOCUMENTS

| | | |
|---|---|---|
| 2010/0077102 A1 | 3/2010 | Lim et al. |
| 2011/0075557 A1 | 3/2011 | Chowdhury et al. |
| 2012/0220330 A1 | 8/2012 | Goldner et al. |
| 2012/0246325 A1* | 9/2012 | Pancorbo Marcos ........................ H04L 63/102 709/227 |
| 2014/0079049 A1* | 3/2014 | Friman ................ H04L 63/306 370/338 |
| 2016/0112896 A1* | 4/2016 | Karampatsis ..... H04W 28/0252 370/230.1 |

FOREIGN PATENT DOCUMENTS

| | | |
|---|---|---|
| EP | 2544417 A1 | 1/2013 |
| RU | 2006131844 A | 5/2008 |
| WO | 2012/140158 A1 | 10/2012 |

\* cited by examiner

METHOD FOR CONTROLLING USER PLANE TRAFFIC FLOWS IN A WIRELESS TELECOMMUNICATION NETWORK

This application is a 371 of International Application No. PCT/SE2013/050134, filed Feb. 15, 2013, the disclosure of which is fully incorporated herein by reference.

TECHNICAL FIELD

Embodiments herein relate to user plane traffic flows in wireless telecommunications network. In particular, embodiments herein relate to a network and a method for controlling user plane traffic flows relating to wireless devices in a wireless telecommunications network.

BACKGROUND

Communication devices such as wireless devices are also known as e.g. mobile terminals, wireless terminals, user equipments and/or mobile stations. Wireless devices are enabled to communicate wirelessly in a wireless telecommunications network, sometimes also referred to as a cellular radio system or cellular networks. The communication may be performed e.g. between two wireless devices, between a wireless device and a regular telephone and/or between a wireless device and a server via a Radio Access Network, RAN, and possibly one or more core networks, comprised within the wireless telecommunications network.

Wireless devices may further be referred to as mobile telephones, cellular telephones, or laptops with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another wireless device or a server.

The wireless telecommunications network covers a geographical area which is divided into cell areas, wherein each cell area being served by a base station, e.g. a Radio Base Station, RBS, which sometimes may be referred to as e.g. "eNB", "eNodeB", "NodeB", "B node", or BTS (Base Transceiver Station), depending on the radio technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the wireless devices within range of the base stations.

In some RANs, several base stations may be connected, e.g. by landlines or microwave, to a radio network controller, e.g. a Radio Network Controller, RNC, in Universal Mobile Telecommunications System, UMTS, and/or to each other. The radio network controller, also sometimes termed a Base Station Controller, BSC, e.g. in GSM, may supervise and coordinate various activities of the plural base stations connected thereto. GSM is short for Global System for Mobile Communications.

In 3rd Generation Partnership Project, 3GPP, Long Term Evolution, LTE, base stations, which may be referred to as eNodeBs or eNBs, may be directly connected to one or more core networks.

UMTS is a third generation mobile communication system, which evolved from the GSM, and is intended to provide improved mobile communication services based on Wideband Code Division Multiple Access, WCDMA, access technology. UMTS Terrestrial Radio Access Network, UTRAN, is essentially a radio access network using wideband code division multiple access for user equipments. The 3GPP has undertaken to evolve further the UTRAN and GSM based radio access network technologies.

As may be seen above, the network topologies of different Radio Access Technologies, RAT, normally differ, i.e. comprises different kinds of network nodes. For example, the LTE RAN comprises only an eNodeB, while the WCDMA RAN comprises a central RNC being connected to a number of NodeBs.

However, as wireless telecommunication networks evolves and are upgraded to more recent or different RATs, new network topologies may arise which differs from the conventional network topologies, i.e. new wireless telecommunication networks with equipments normally comprised in different RATs. One example of this when LTE functionalities are located in the conventional RNC site of a WCDMA RAN to enhance the conventional RNCs functionality in terms of e.g. advanced load sharing or service awareness for the multiple RATs.

While it is possible for the equipments of the differing RATs to co-exist in the same access network, and serve separate user plane traffic flows based on which RAT each access points that is generating the user plane traffic flows is currently employing, it could be beneficial to explore possible advantages that may arise from such a wireless telecommunication network configuration comprising different RATs. In such cases, issues such as e.g. network capacity, transmission costs and latency performance, etc., should also be taken into consideration.

SUMMARY

It is an object of embodiments herein to improve the utilization of wireless telecommunication networks.

According to a first aspect of embodiments herein, the object is achieved by a method performed by a first network node for controlling user plane traffic flows relating to wireless devices in a wireless telecommunications network. The first network node is configured to transmit the user plane traffic flows over a first transmission path to a second network node in the wireless telecommunications network. The first network node determines that a user plane traffic flow related to a wireless device is to be transmitted over a second transmission path to an intermediary network node configured to communicate with the first and second network nodes in the wireless telecommunications network based on the type of the user plane traffic flow, the wireless device related to the user plane traffic flow, and/or the content of the user plane traffic flow. Then, the first network node controls the user plane traffic flow such that the user plane traffic flow is transmitted over the second transmission path to the intermediary network node in the wireless telecommunications network.

According to a second aspect of embodiments herein, the object is achieved by a first network node for controlling user plane traffic flows relating to wireless devices in a wireless telecommunications network. The first network node is configured to transmit the user plane traffic flows over a first transmission path to a second network node in the wireless telecommunications network. The first network node comprises processing circuitry configured to determine that a user plane traffic flow relating to a wireless device is to be transmitted over a second transmission path to an intermediary network node configured to communicate with the first and second network nodes in the wireless telecommunications network based on the type of the user plane traffic flow, the wireless device related to the user plane traffic flow, and/or the content of the user plane traffic flow. Also, the processing circuitry is configured to control the user plane traffic flow such that the user plane traffic flow is transmitted over the second transmission path to the intermediary network node in the wireless telecommunications network.

By inspecting each user plane traffic flow relating to wireless devices in the wireless telecommunications network with respect to the type of the user plane traffic flow, the wireless device related to the user plane traffic flow and/or the content of the user plane traffic flow; a network node is able to determine a transmission path for each user plane traffic flow based on supporting a specific functionality present in one or more of the available RATs, or supporting a specific functionality collocated in the wireless telecommunication network, for each user plane traffic flow.

Thus, the network node may effectively utilize the specific functionalities of each available RAT and/or collocated functionalities comprised in the wireless telecommunication network. Hence, the utilization of wireless telecommunication networks is improved.

BRIEF DESCRIPTION OF THE DRAWINGS

Features and advantages of the embodiments will become readily apparent to those skilled in the art by the following detailed description of exemplary embodiments thereof with reference to the accompanying drawings, wherein.

DETAILED DESCRIPTION

The figures are schematic and simplified for clarity, and they merely show details which are essential to the understanding of the embodiments presented herein, while other details have been left out. Throughout, the same reference numerals are used for identical or corresponding parts or steps.

Figure 1:
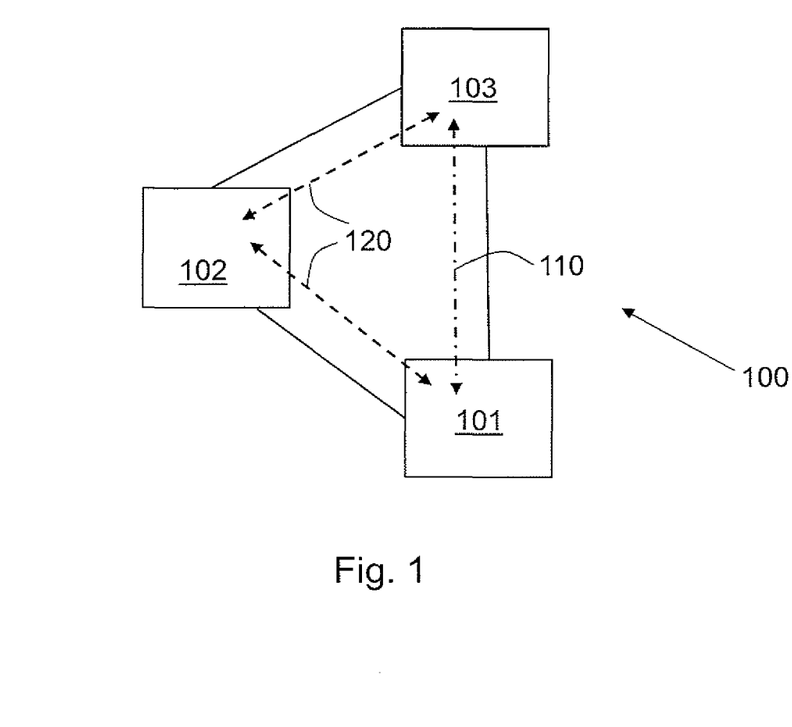
FIG. 1 is a schematic block diagram illustrating a wireless telecommunications network comprising embodiments of a network node.

FIG. 1 depicts an example of a wireless telecommunications network 100 in which the embodiments described herein may be implemented. The wireless telecommunications network 100 comprises a first network node 101, an intermediary network node 102, and a second network node 103.

The first network node 101 is configured to receive user plane traffic flows relating to wireless devices in the wireless telecommunications network 100. The first network node 101 is also configured to control these user plane traffic flows relating to the wireless devices, and to transmit the user plane traffic flows over a first transmission path 110 to the second network node 103 in the wireless telecommunications network 100.

According to some embodiments, the first network node 101 is further configured to determine that a user plane traffic flow relating to a wireless device is instead to be transmitted over a second transmission path 120 to the intermediary network node 102. Here, the intermediary network node 102 is configured to communicate with the first network node 101 and the second network node 103 in the wireless telecommunications network 100. The determining of the first network node 101 is based on the type of the user plane traffic flow, the wireless device related to the user plane traffic flow, and/or the content of the user plane traffic flow.

Then, the first network node 101 controls the user plane traffic flow such that the user plane traffic flow is transmitted over the second transmission path 120 to the intermediary network node 102 in the wireless telecommunications network 100.

By having the first network node 101 inspecting each incoming user plane traffic flow relating to wireless devices in the wireless telecommunications network 100 with respect to one or more of the type, originating wireless device and/or content of the user plane traffic flow, the first network node 101 is able to determine a transmission path, i.e. the first transmission path 110 or the second transmission path 120, for each user plane traffic flow based on supporting a specific functionality for each of the user plane traffic flows. This specific functionality may be present in the intermediary network node 102 according to a RAT other than the RAT of the first network node 101, or simply a specific functionality collocated in the intermediary network node 102 in the wireless telecommunication network 100.

This means that the first network node 101 effectively may utilize the specific functionalities of each RAT and/or collocated specific functionalities comprised in the wireless telecommunication network 100. This will improve the utilization of the wireless telecommunication network 100.

It should be noted that the first network node 101, the intermediary network node 102 and the second network node 103 may represent various different nodes or network equipments implemented in different configurations of the wireless communications network 100.

In some embodiments, the intermediary node 102 is a Radio Network Controller, RNC, or a stand-alone routing node. In this case, the first network node 101 may be an eNodeB or eNB, and the second network node 103 may be a Serving Gateway, SGW. Alternatively, the first network node 101 may be a SGW, and the second network node 103 may be an eNodeB or eNB. These embodiments are shown and described in more detail below in reference to FIG. 2.

In some embodiments, when the intermediary node 102 is a stand-alone routing node, the first network node 101 may be a WiFi Access Point/Controller, WiFi AP/AC, and the second network node 103 may be a Packet Data Network Gateway, PGW. Alternatively, the first network node 101 may be a PGW, and the second network node 103 may be a WiFi AP/AC. These embodiments are shown and described in more detail below in reference to FIG. 3.

In some embodiments, when the intermediary node 102 is a stand-alone routing node, the first network node 101 may be a PGW, and the second network node 103 may be a Service Aware Proxy, SAP. Alternatively, the first network node 101 may be a SAP, and the second network node 103 may be a PGW. These embodiments are shown and described in more detail below in reference to FIG. 4.

However, the embodiments presented above should not be construed as limiting, since the same principle may be applied in yet further configurations of the wireless communications network 100. For example, the intermediary node 102 may be a stand-alone routing node, whereby the first network node 101 may be an RNC and the second network node 103 may be a SGW, or vice versa. According to another example, the intermediary node 102 may be a SAP, whereby the first network node 101 may be a PGW, and the second network node 103 may be a core network routing node, or vice versa. According to a further example, the intermediary node 102 may be a SAP, whereby the first network node 101 may be a eNodeB or WiFi AC/AP, and the second network node 103 may be a PGW, or vice versa. According to yet a further example, the intermediary node 102 may be a RNC, whereby the first network node 101 may be a WiFi AC/AP, and the second network node 103 may be a PGW, or vice versa.

Figure 2:
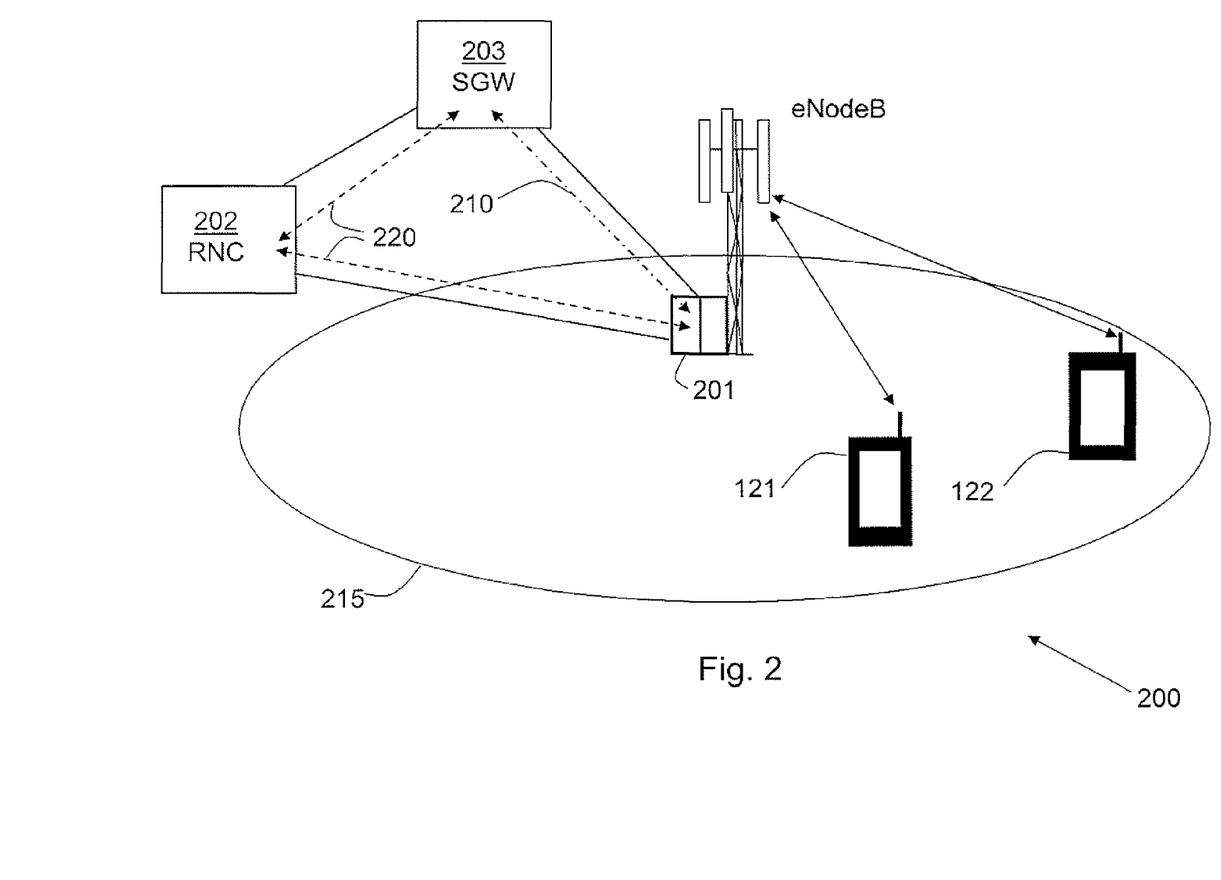
FIG. 2 is a schematic illustration of embodiments of network nodes in a wireless telecommunications network.

FIG. 2 depicts an example of a wireless telecommunications network 200 comprising embodiments of network nodes. In this example, the intermediary node 102 is an RNC 202. Also, the first network node 101 is an eNodeB 201 and the second network node 103 is a SGW 203, or vice versa.

As shown in FIG. 2, the wireless telecommunications network 200 comprises a radio base station, i.e. an eNodeB or eNB 201. The eNodeB 201 serves at least one cell 215. The eNodeB 201 is an entity capable to communicate over a radio carrier with wireless devices 121, 122 being present in the cell 215. The eNodeB 201 may be directly connected to one or more core networks via a Serving Gateway, SGW 203. When using the conventional LTE RAN functionality, the eNodeB 110 is configured to communicate with the SGW 203 over a first transmission path 210. Hence, in this respect, the eNodeB 201 and the SGW 203 may be considered forming part of an LTE part of the wireless telecommunications network 200.

Further, the wireless telecommunications network 200 comprises a Radio Network Controller, RNC 202. The RNC 202 is connected to and configured to serve several other radio base stations, such as, e.g. NodeBs or B-nodes in a WCDMA RAN (not shown). The NodeBs or B-nodes are each configured to serve one or more cells, and are capable to communicate over a radio carrier with wireless devices being present in its one or more cell. The RNC 202 is configured to supervise and coordinate various activities of these other base stations, and serve a link to a core network node, such as, e.g. the SGW 203 (in case of using S12-interface which supports a Direct Tunnel functionality), for these other base stations. Hence, in this respect, the RNC 202 and the SGW 203 may be considered forming part of a WCDMA part of the wireless telecommunications network 100.

In some embodiments, the RNC 202 may also be configured to perform a specific functionality in the wireless telecommunications network 300.

For example, in some embodiments, the RNC 202 may comprise a caching functionality, such as, e.g. a cache memory capable of caching, i.e. storing, content that has been transmitted in previous user plane traffic flows via the RNC 202. By using a common functionality node, i.e. the RNC 202 in this case, for several RATs, it is possible to utilize a larger population contributing to the cache content and cache hit rate. This may also be beneficial in an Operations and Maintenance, OAM, perspective.

In some embodiments, the RNC 202 may comprise a TCP proxy functionality for improving TCP data traffic transmitted via the RNC 202.

In some embodiments, the RNC 202 may comprise a payload compression functionality such that the RNC 202 may compress content within user plane traffic flows that is transmitted via the RNC 202. This advantageously may provide a shared collocated compression endpoint for different RATs in the wireless telecommunication network 200.

The eNodeB 201 is also connected to the RNC 202 in the wireless telecommunications network 100. Hence, there also exists a possibility in the wireless telecommunications network 100 for the eNodeB 201 to communicate with the SGW 203 via the RNC 202, i.e. via a second transmission path 220.

In some embodiments, the first transmission path 210 and the second transmission path 220 to the SGW 203 and the RNC 202, respectively, from the eNodeB 201 may be implemented by using e.g. a GPRS Tunneling Protocol User plane, GTP-U, tunnel split. This involves tunnel configuration information being transmitted between the eNodeB 201 and the SGW 203 or the RNC 202, and may be used for various interfaces, such as, e.g. a Iu-PS/S12 interface, a S1-U interface, and a S2a interface.

For the uplink case, the eNodeB 201 is configured to receive user plane traffic flows from the wireless devices 121, 122. The eNodeB 201 is also configured to transmit the user plane traffic flows to the SGW 203 via the first transmission path 210 or the second transmission path 220. This may be performed by the eNodeB 201 by determining that a user plane traffic flow relating to a wireless device 121, 122 is to be transmitted over the second transmission path 220 to the RNC 202; this instead of being transmitted over the first transmission path 210 directly to the SGW 203. This may be determined by the eNodeB 201 based on the type of the user plane traffic flow, the wireless device related to the user plane traffic flow, and/or the content of the user plane traffic flow. Then, the eNodeB 201 may control the user plane traffic flow such that the user plane traffic flow is transmitted over the second transmission path 210 to the RNC 202.

Thus, the SGW 203 is configured to receive the user plane traffic flows of the wireless devices 121, 122 from the eNodeB 201 via the first transmission path 210 or the second transmission path 220. The SGW 203 is also configured to transmit the user plane traffic flows towards the intended recipient, such as, e.g. a content server, other wireless devices, etc., via other network equipments within the core network of the wireless communications network 200 (not shown).

For the downlink case, the SGW 203 is configured to receive user plane traffic flows to the wireless devices 121, 122 from other network equipments within the core network of the wireless communications network 200. The SGW 203 is also configured to transmit the user plane traffic flows towards the wireless devices 121, 122 to the eNodeB 201 via the first transmission path 210 or the second transmission path 220. This may be performed by the SGW 203 in the same manner as described for the eNodeB 201, i.e. based on the type, originating wireless device and/or content of the user plane traffic flow.

Thus, the eNodeB 201 is configured to receive the user plane traffic flows towards the wireless devices 121, 122 from the SGW 203 via the first transmission path 210 or the second transmission path 220. The user plane traffic flows is then transmitted to the wireless devices 121, 122 by the eNodeB 201.

It should be noted that the wireless telecommunications network 200 may be considered a mixed cellular network in that it comprises two or more different Radio Access Technologies (RATs), such as, e.g. LTE and WCDMA, as shown by the example above. It should however be noted that the embodiments described herein in not restricted to these specific RATs, but may also be implemented in a similar way in other combinations of RATs.

Figure 3:
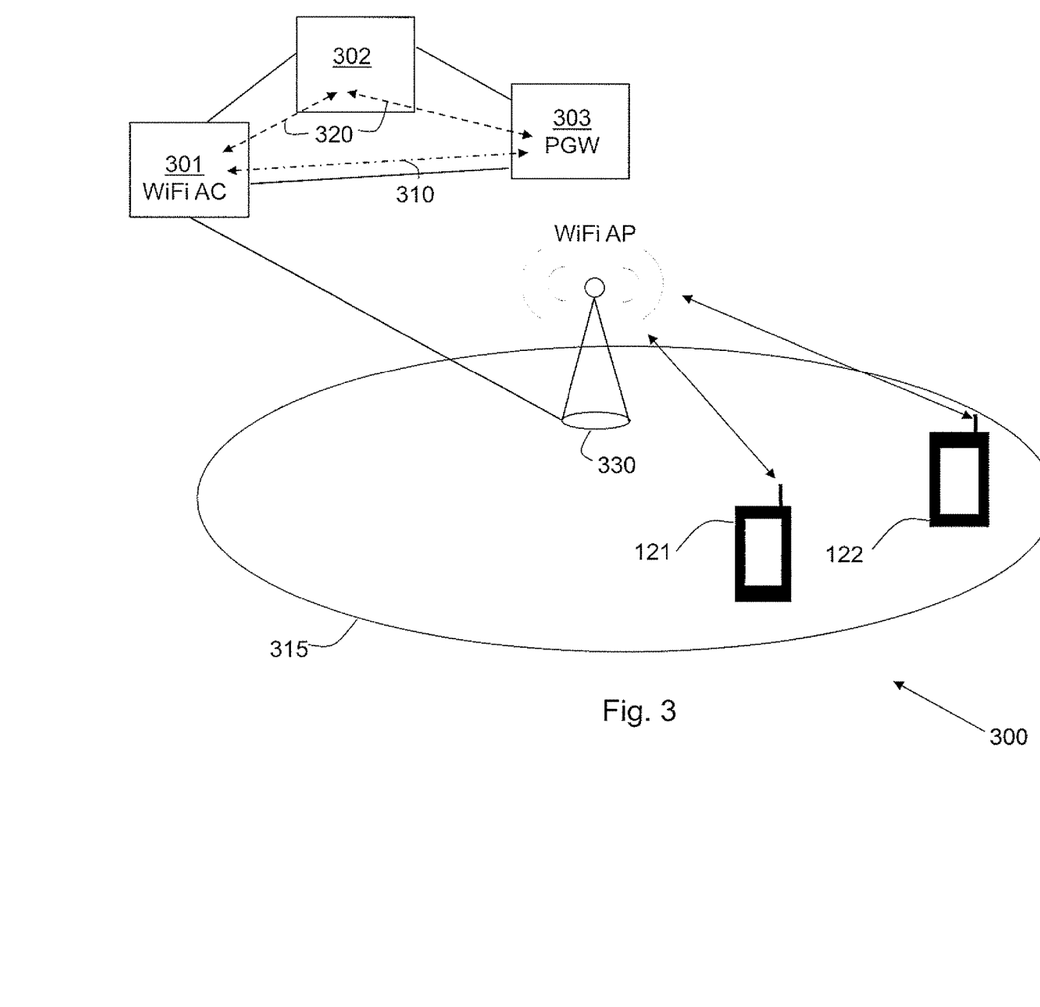
FIG. 3 is another schematic illustration of embodiments of network nodes in a wireless telecommunications network.

FIG. 3 depicts an example of a wireless telecommunications network 300 in comprising embodiments of network nodes. In this example, the intermediary node 102 is a stand-alone routing node 302. Also, the first network node 101 is a WiFi AC/AP 301 and the second network node 103 is a PGW 303, or vice versa.

As shown in FIG. 3, the wireless telecommunications network 300 comprises a WiFi Access Controller, WiFi AC 301. The WiFi AC 301 is connected to and configured to serve one or more WiFi Access Point, WiFi AP 330. The WiFi AP 330 is an entity capable to communicate over a WiFi interface with wireless devices 121, 122 being present within its WiFi coverage area 315. The WiFi AC 301 may be directly connected to one or more core networks via a Packet Data Network Gateway, PGW 303. The WiFi AC 301 is configured to communicate with the PGW 303 over a first transmission path 310. It should also be noted that the WiFi AC 301 and the WiFi AP 330 may be collocated in the same physical entity. Furthermore, if e.g. no WiFi AC 301 is present or the user plane data traffic is configured to flow via the WiFi AP 330 only, the WiFi AP 330 also may comprise the same functionalities as described herein for the WiFi AC 301.

Furthermore, the wireless telecommunications network 300 comprises a stand-alone routing node 302. The stand-alone routing node 302 may also be referred to as e.g. a router, a routing network node or specific functionality node.

The stand-alone routing node 302 may be configured to perform a specific functionality in the wireless telecommunications network 300. For example, in some embodiments, the stand-alone routing node 302 may comprise a caching functionality, such as, e.g. a cache memory capable of caching, i.e. storing, content that has been transmitted in previous user plane traffic flows towards the wireless device 121, 122 via the stand-alone routing node 302. In some embodiments, the stand-alone routing node 302 may comprise a TCP proxy functionality for improving TCP data traffic. In some embodiments, the stand-alone routing node 302 may comprise a payload compression functionality such that the stand-alone routing node 302 may compress content within user plane traffic flows.

The stand-alone routing node 302 is connected to the PGW 303. The WiFi AC 301 is also connected to the stand-alone routing node 302. This provides a possibility for the WiFi AC 301 to communicate with the PGW 303 via the stand-alone routing node 302, i.e. via a second transmission path 320.

For the uplink case, the WiFi AC 301 is configured to receive user plane traffic flows from the wireless devices 121, 122 via the WiFi AP 330. The WiFi AP 330 in turn receives the user plane traffic flows from the wireless devices 121, 122 over its WiFi interface. The WiFi AC 301 is also configured to transmit the user plane traffic flows to the PGW 303 via the first transmission path 310 or the second transmission path 320. This may be performed by the WiFi AC 301 by determining that a user plane traffic flow relating to a wireless device 121, 122 is to be transmitted over the second transmission path 320 to the standalone routing node 302; this instead of being transmitted over the first transmission path 310 directly to the PGW 303. This may be determined by the WiFi AC 301 based on the type of the user plane traffic flow, the wireless device related to the user plane traffic flow, and/or the content of the user plane traffic flow. Then, the WiFi AC 301 may control the user plane traffic flow such that the user plane traffic flow is transmitted over the second transmission path 320 to the stand-alone routing node 302.

Thus, the PGW 303 is configured to receive the user plane traffic flows of the wireless devices 121, 122 from the WiFi AC 301 via the first transmission path 310 or the second transmission path 320. The PGW 303 is also configured to transmit the user plane traffic flows towards the intended recipient via other network equipments within the core network of the wireless communications network 300 (not shown).

For the downlink case, the PGW 303 is configured to receive user plane traffic flows to the wireless devices 121, 122 from network equipments within the core network of the wireless communications network 300 or other external networks. The PGW 303 is also configured to transmit the user plane traffic flows towards the wireless devices 121, 122 to the WiFi AC 301 via the first transmission path 310 or the second transmission path 320. This may be performed by the PGW 303 in the same manner as described for the WiFi AC 301, i.e. based on the type, originating wireless device and/or content of the user plane traffic flow.

Thus, the WiFi AC 301 is configured to receive the user plane traffic flows towards the wireless devices 121, 122 from the PGW 303 via the first transmission path 310 or the second transmission path 320. The user plane traffic flows is then transmitted to the wireless devices 121, 122 by the WiFi AC 301 over the WiFi interface.

Figure 4:
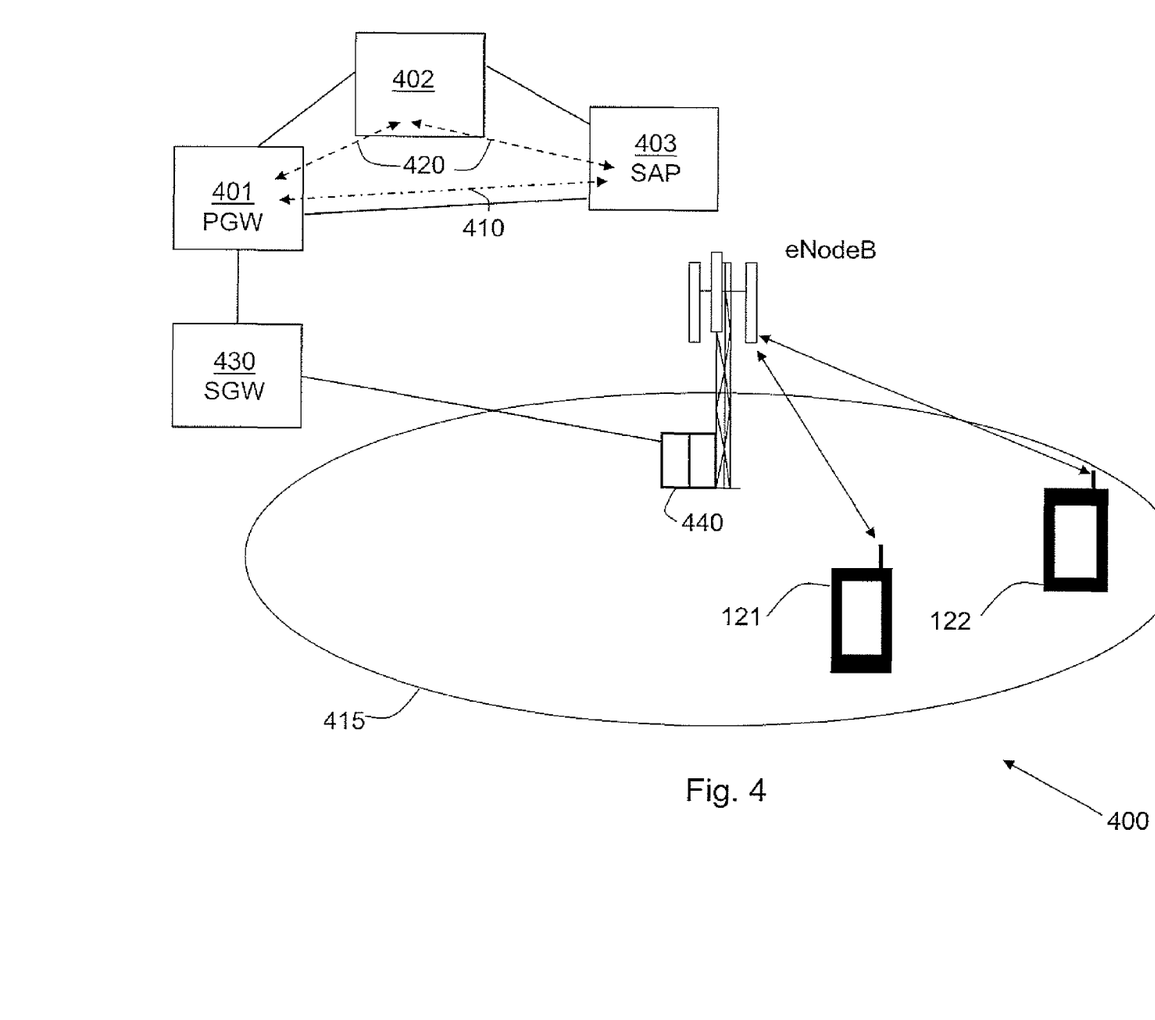
FIG. 4 is a further schematic illustration of embodiments of network nodes in a wireless telecommunications network.

FIG. 4 depicts an example of a wireless telecommunications network 400 comprising embodiments of network nodes. In this example, the intermediary node 102 is a stand-alone routing node 402. Also, the first network node 101 is a PGW 401 and the second network node 103 is a SAP 403, or vice versa.

As shown in FIG. 2, the wireless telecommunications network 400 comprises a Packet Data Network Gateway, PGW 401. The PGW 401 is connected to and configured to serve one or more Serving Gateway, SGW 430. Also, the SGW 430 is connected to and configured to serve one or more radio base stations, i.e. an eNodeB or eNB 440. The eNodeB 440 serves at least one cell 415. The eNodeB 440 is an entity capable to communicate over a radio carrier with wireless devices 121, 122 being present in the cell 415. Hence, the PGW 401 via the SGW 430 connects the eNodeB 440 to one or more core networks in the wireless telecommunications network 400.

The PGW 401 is also directly connected to a Service Aware Proxy, SAP 403. The SAP 403 may be located in one or more core networks of the wireless telecommunications network 400.

It should be noted that the term "Service Aware Proxy", or "SAP", should herein be interpreted as an entity comprising service aware network functions that may exploit an information exchange between the telecommunications network domain, e.g. the PGW 401 to the eNodeB 440, and a service domain, e.g. the PGW 401 to other network equipments within the core network of the wireless communications network 400 or other external networks, in order to enhance performance for user plane traffic flows associated with the wireless devices 121, 122. One example of such a service aware network function may be a cache and video optimization function. The SAP 403 may be implemented a separate entity above, below or on an (S)Gi interface.

The PGW 401 is configured to communicate with the SAP 403 over a first transmission path 410.

Furthermore, the wireless telecommunications network 400 comprises a stand-alone routing node 402. The stand-alone routing node 402 may also be referred to as e.g. a router, a routing network node, or specific functionality node.

The stand-alone routing node 402 may be configured to perform a specific functionality in the wireless telecommunications network 400. For example, in some embodiments, the stand-alone routing node 402 may comprise a caching functionality, such as, e.g. a cache memory capable of caching, i.e. storing, content that has been transmitted in previous user plane traffic flows towards the wireless device 121, 122 via the stand-alone routing node 402. In some embodiments, the stand-alone routing node 402 may comprise a TCP proxy functionality for improving TCP data traffic. In some embodiments, the stand-alone routing node 402 may comprise a payload compression functionality such that the stand-alone routing node 402 may compress content within user plane traffic flows.

The stand-alone routing node 402 is connected to the PGW 401, The SAP 403 is also connected to the stand-alone routing node 402. This provides a possibility for the PGW 401 to communicate with the SAP 403 via the stand-alone routing node 402, i.e. via a second transmission path 420.

For the uplink case, the PGW 401 is configured to receive user plane traffic flows from the wireless devices 121, 122 via the SGW 430 and the eNodeB 440. The PGW 401 is also configured to transmit the user plane traffic flows to the SAP 403 via the first transmission path 410 or the second transmission path 420. This may be performed by the PGW 401 by determining that a user plane traffic flow relating to a wireless device 121, 122 is to be transmitted over the second transmission path 420 to the stand-alone routing node 402; this instead of being transmitted over the first transmission path 410 directly to the SAP 403. This may be determined by the PGW 401 based on the type of the user plane traffic flow, the wireless device related to the user plane traffic flow, and/or the content of the user plane traffic flow. Then, the PGW 401 may control the user plane traffic flow such that the user plane traffic flow is transmitted over the second transmission path 420 to the stand-alone routing node 402.

Thus, the SAP 403 is configured to receive the user plane traffic flows of the wireless devices 121, 122 from the PGW 401 via the first transmission path 410 or the second transmission path 420. The SAP 403 may also be configured to transmit the user plane traffic flows towards the intended recipient via other network equipments within the core network of the wireless communications network 400 (not shown).

For the downlink case, the SAP 403 may be configured to receive user plane traffic flows to the wireless devices 121, 122 from network equipments within the core network of the wireless communications network 400 or other external networks. The SAP 403 is also configured to transmit the user plane traffic flows towards the wireless devices 121, 122 to the PGW 401 via the first transmission path 410 or the second transmission path 420. This may be performed by the SAP 403 in the same manner as described for the PGW 401, i.e. based on the type, originating wireless device and/or content of the user plane traffic flows.

Thus, the PGW 401 is configured to receive the user plane traffic flows towards the wireless devices 121, 122 from the SAP 403 via the first transmission path 410 or the second transmission path 420. The user plane traffic flows is then transmitted to the wireless devices 121, 122 via the SGW 430 and the eNodeB 440.

Figure 5:
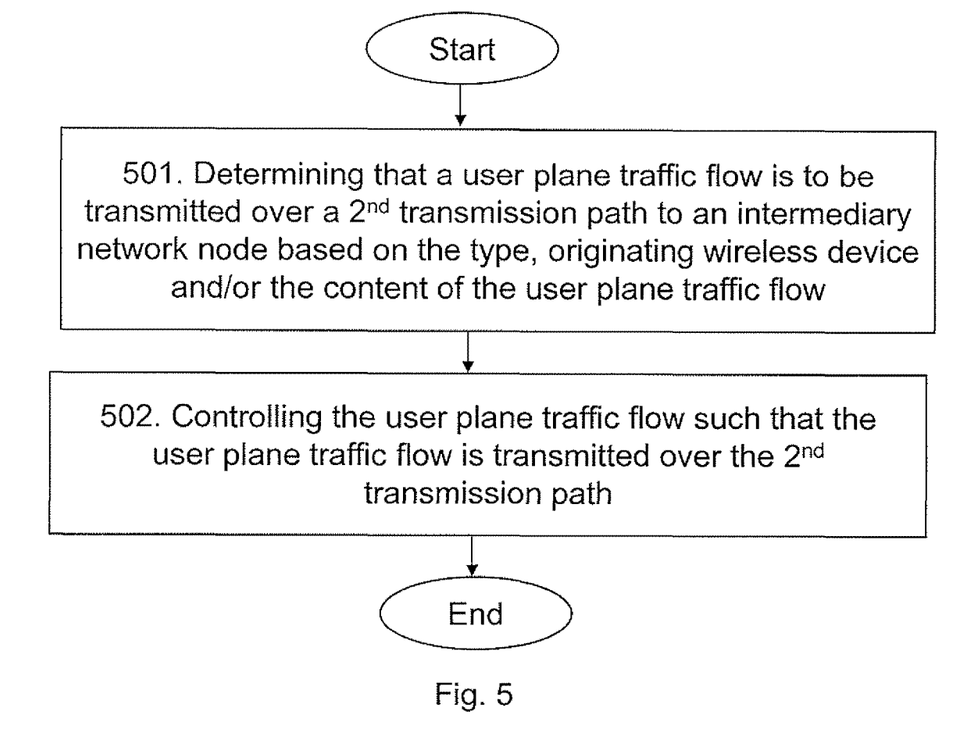
FIG. 5 is a flowchart depicting embodiments of a method in a network node.

Example of embodiments of a method performed by a first network node 101 for controlling user plane traffic flows relating to wireless devices in a wireless telecommunications network 100 will now be described with reference to a flowchart depicted in FIG. 5. FIG. 5 is an illustrated example of exemplary actions or operations which may be taken by the network node 101.

The first network node 101 is configured to transmit the user plane traffic flows over a first transmission path 110 to a second network node 103 in the wireless telecommunications network 100. The method may comprise the following actions.

Action 501

In this action, the first network node 101 determines that a user plane traffic flow related to a wireless device 121,122 is to be transmitted over a second transmission path 120 to an intermediary network node 103 based on the type of the user plane traffic flow, the wireless device related to the user plane traffic flow, and/or the content of the user plane traffic flow. The intermediary network node 103 is in communication with the first and second network nodes 101,102 in the wireless telecommunications network 100.

By inspecting user plane traffic flows relating to wireless devices 121, 122 in the wireless telecommunications network 100 with respect to one or more of the type, originating wireless device and/or content of the user plane traffic flow, the first network node 101 is able to determine a transmission path, i.e. the first transmission path 110 or the second transmission path 120, for each user plane traffic flow based on supporting a specific functionality for each of the user plane traffic flows. This specific functionality is present in the intermediary network node 102 by which the second transmission path 120 is routed in the wireless telecommunication network 100.

Action 502

In this action, the first network node 101 controls the user plane traffic flow such that the user plane traffic flow is transmitted over the second transmission path 120 to the intermediary network node 103 in the wireless telecommunications network 100. In this way, the user plane traffic flow is rerouted with respect to the specific functionality present in the intermediary node 102.

Figure 6:
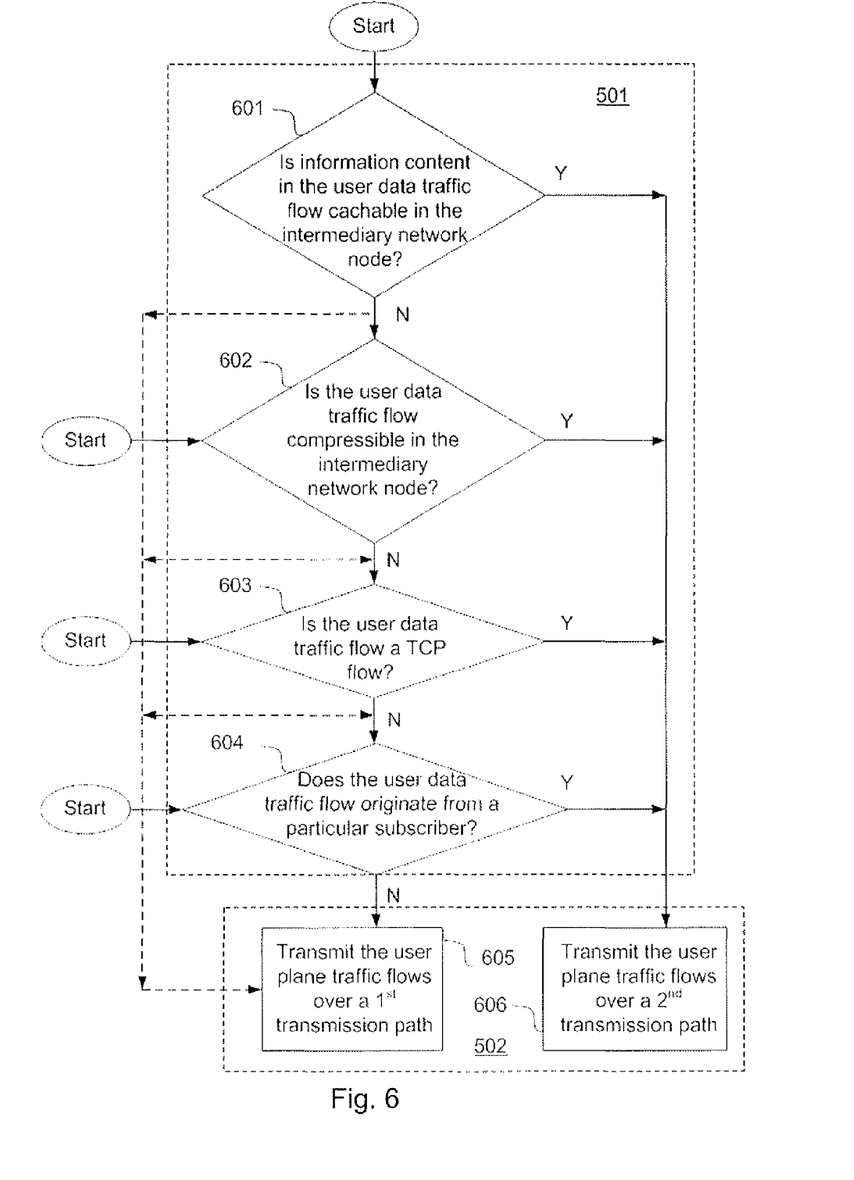
FIG. 6 is another flowchart depicting embodiments of a method in a network node.

A more detailed example of the embodiments of the method shown in and described with reference to FIG. 5, will now be described with reference to a flowchart depicted in FIG. 6. FIG. 6 is an illustrated example of exemplary actions or operations which may be taken by the network node 101. The method may comprise the following actions, wherein Actions 601-604 refers to Action 501 in FIG. 5 and Action 605-606 refers to Action 502 in FIG. 5.

Action 601

In this action, the first network node 101 may determine that the content of the user plane traffic flow indicates that content requested in the user plane traffic flow is content that is cacheable in a cache memory in the intermediary network node 102. This may e.g. be performed if the intermediary network node 102 comprises a caching functionality or cache, such as, e.g. a cache memory capable of caching, i.e. storing, content that has been transmitted in previous user plane traffic flows via the intermediary network node 102.

This may be advantageous since such a caching may e.g. provide a faster download of content to the wireless device 121, 122, because content may be fetched from the caching in the intermediary network node 102 instead of from the original content server (if content is available in the cache). Actually, this gives both a faster download of content for the wireless device 121, 122, as well as, saving bandwidth in the rest of the wireless communication network 100 since no transmissions beyond the intermediary network node 102 towards the core network is needed. This is also true in the downlink case, wherein transmissions beyond the intermediary network node 102 towards the wireless device 121, 122 may not be needed, thus saving bandwidth in the RAN.

Hence, if content is cacheable, then the first network node 101 may proceed to Action 606. Otherwise, the first network node 101 may proceed to either one of Action 602, 603, 604. Alternatively, the first network node 101 may proceed to Action 605 for transmitting the user plane traffic flow on the first transmission path 110.

In some embodiments, the first network node 101 may determine that the user plane traffic flow is of another type than a real-time communication user plane traffic flow or a live streaming user plane traffic flow.

This may be advantageous since not all content will benefit from using the cache in the intermediary network node 102, such as, e.g. real-time services, live streaming and/or web pages comprising highly dynamic updates, etc. This traffic type would instead suffer from increased latency from the redirection to the second transmission path 120, and increased latency from the filtering function of the cache in the intermediary network node 102. Thus, this traffic type should be transmitted over the first transmission path 110 to the second network node 103.

Also, this determination may be performed by the first network node 101 by using Internet Protocol, IP, header classification. For example, in order to determine whether content requested in the user plane traffic flow is cacheable or not, the first network node 101 may perform an IP header classification to identify known ports and IP addresses, such as, e.g. known ports and IF addresses used for real-time communication or live streaming.

In some embodiments, the determination may be made by the first network node 101 by performing or using Deep Packet Inspection, DPI. For example, in order to determine whether content requested in the user plane traffic flow is cacheable or not, the first network node 101 may use DPI to check into HTTP data traffic to determine whether a specific content may be stored in the cache (e.g. wrt to type, protocol, etc.). Also, the probability that the specific content would be stored in the cache could be noted and utilized by the first network node 101 by using DPI.

Action 602

The first network node 101 may in this action determine that the user plane traffic flow is compressible by a payload compression functionality in the intermediary network node 102. This may e.g. be performed if the intermediary network node 102 comprises a payload compression functionality. This is advantageous since a payload compression functionality may compress content within user plane traffic flows in order to e.g. save on the bandwidth and decrease the transmission load. Also, since the total number of transmitted bits is decreased, which decreases the total transmission load in the wireless telecommunications network 100, it also gives the end-user of the wireless devices 121, 122 a faster service.

Hence, if the user plane traffic flow is compressible, the first network node 101 may proceed to Action 606. Otherwise, the first network node 101 may proceed to either one of Action 603, 604. Alternatively, the first network node 101 may proceed to Action 605 for transmitting the user plane traffic flow on the first transmission path 110.

Payload compression may be performed by the intermediary node 102 at different levels, e.g. TCP payload level or IP payload level. The former case resulting in that only TCP data traffic will be affected, while the latter case comprises all IP traffic. Payload compression is also done point to point, involving two end points; one compressor and one de-compressor.

One example of a payload compression functionality is payload de-duplication. In payload de-duplication, byte patterns are analyzed and stored at both endpoints. The byte patterns are then replaced with an index, or signature, whenever a repeated byte pattern appears. Another example of a payload compression functionality is Lempel-Ziv, LZ, compression, of which one variant is GZIP. GZIP compresses within each file, while e.g. payload de-duplication works across file boundaries. These techniques may be used in combination.

In any case, there is data traffic that will not give any substantial gain, such as, e.g. encrypted data traffic or real-time services. User plane traffic flows comprising these services will lose in performance if redirected over the second transmission path 120 compared to being transmitted over the first transmission path 110. This may partly be because of latency caused by the redirection itself, and partly because of compression processing in the intermediary node 102.

Hence, in some embodiments, the first network node 101 may determine that the user plane traffic flow is of another type than a real-time communication user plane traffic flow or a live streaming user plane traffic flow, since real-time communication user plane traffic flows or live streaming user plane traffic flows are unsuitable for compression, or not compressible, via the intermediary network node 102. This may be performed by the first network node 101 by using IP header classification.

In some embodiments, the first network node 101 may determine that the content of the user plane traffic flow is unencrypted by performing or using DPI, since encrypted data traffic is unsuitable for compression, or not compressible, via the intermediary network node 102.

Herein, the term "compressible" should be interpreted as data which provides a gain when being compressed as compared to the same data before the compression. All data may be processed by compression algorithms, but not all will provide a gain when being compressed. This is typical for e.g. encrypted data (however, encryption keys may be considered compressible) or real-time services (due to encoding and delay requirements).

It should also be noted that the first network node 101 may in this action alternatively determine that the user plane traffic flow is de-compressible by a payload compression functionality in the intermediary network node 102. This means that it may determine that the content within user plane traffic flows is already compressed, and therefore may be de-compressed by the payload compression functionality in the intermediary network node 102.

Action 603

The first network node 101 may in this action determine that the type of the user plane traffic flow is Transport Control Protocol, TCP. This may e.g. be performed in case the intermediary network node 102 comprises a TCP proxy functionality.

This is advantageous since a TCP proxy may improve the TCP data traffic by providing a more efficient transportation for this type of data traffic. A TCP proxy may provide faster interactions and data downloading times between a content server, e.g. on the Internet, and the wireless device 121, 122.

This may be performed by splitting the TCP connection into two separate connections, which decreases the overall round trip time, and by further optimizing the play-out speed from the TCP proxy towards the wireless device 121, 122.

The TCP proxy may also provide a robust congestion handling and protection for the TCP data traffic. For example, it may provide protection against extreme downlink bit rate peaks, which may be caused by delayed TCP acknowledgements on the uplink (e.g. as a result of radio interface retransmissions, etc.). In another example, it may provide robustness in that knowledge of the radio access network may be fed back to the TCP proxy, which may adapt the transmission of the TCP data traffic to the actual radio conditions. For other traffic than TCP data traffic, there may instead be a potential loss due to the increased delay from a potential redirection to the second transmission path 120 in this case.

If so, the first network node 101 may proceed to Action 606. Otherwise, the first network node 101 may proceed to either one of Action 604. Alternatively, the first network node 101 may proceed to Action 605 for transmitting the user plane traffic flow on the first transmission path 110.

In some embodiments, the first network node 101 may determine that the type of the user plane traffic flow is TCP by IP header classification, e.g. by checking the protocol type field of the 5-tuple in the user plane traffic flow.

Action 604

In this action, the first network node 101 may determine the subscription type of the wireless device 121, 122 to which the user plane traffic flow is related.

This enables the first network node 101 to provide certain advantages to specific groups of subscribers. For example, a user plane traffic flow originating from one of the wireless devices 121, 122 having a subscription type belonging to the specific group of subscribers may be redirected over the second transmission path 120 in case this is advantageous (see previous Actions 601-603). This may provide an enhanced performance for the specific groups of subscribers.

If the wireless device 121, 122 is of a first subscription type, the first network node 101 may proceed to Action 606. Otherwise, i.e. if the wireless device 121, 122 is not of the first subscription type, the first network node 101 may proceed to Action 605 for transmitting the user plane traffic flow on the first transmission path 110.

Action 605

The first network node 101 may in this action control the user plane traffic flow such that the user plane traffic flow is transmitted over the first transmission path 110 to the intermediary network node 102 in the wireless telecommunications network 100.

Action 605

In this action, the first network node 101 may control the user plane traffic flow such that the user plane traffic flow is transmitted over the second transmission path 120 to the intermediary network node 102 in the wireless telecommunications network 100.

Figure 7:
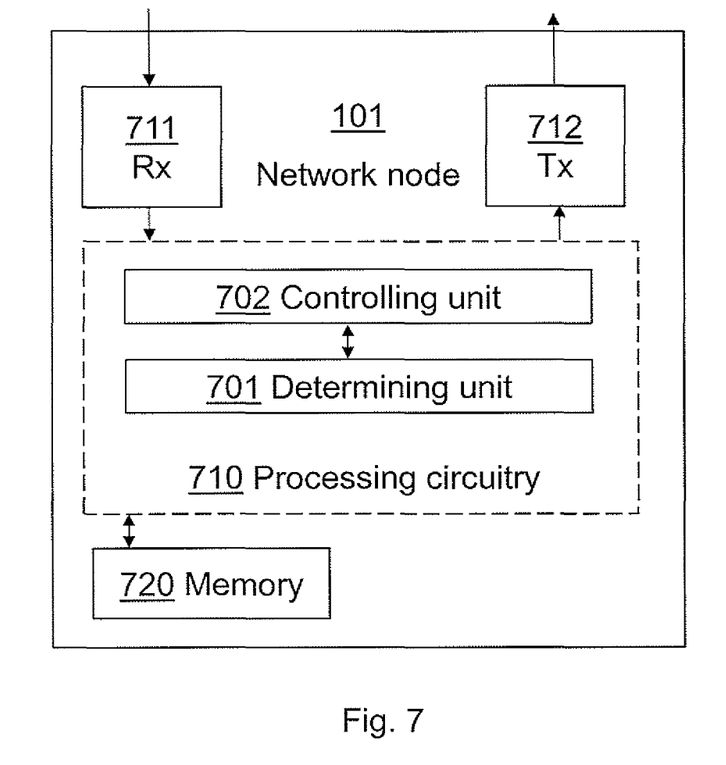
FIG. 7 is a block diagram depicting embodiments of a network node.

To perform the method actions in the first network node 101 for controlling user plane traffic flows relating to wireless devices in a wireless telecommunications network 100, the first network node 101 may comprise the following arrangement depicted in FIG. 7.

FIG. 7 shows a schematic block diagram of embodiments of the first network node 101. The first network node 101 is configured to transmit the user plane traffic flows over a first transmission path 110 to a second network node 103 in the wireless telecommunications network 100.

The first network node 101 comprises a determining unit 701, which may also be referred to as a determining device or circuitry. The determining unit 701 is configured to determine that a user plane traffic flow relating to a wireless device 121, 122 is to be transmitted over a second transmission path 120 to an intermediary network node 103 based on the type of the user plane traffic flow, the wireless device related to the user plane traffic flow, and/or the content of the user plane traffic flow. The intermediary network node 103 is in communication with the first and second network nodes 101, 102 in the wireless telecommunications network 100.

In some embodiments, the determining unit 701 may be configured to determine that the user plane traffic flow is to be transmitted over the second transmission path 120 to the intermediary network node 103 based on that the content of the user plane traffic flow indicates that content requested in the user plane traffic flow is content that is cacheable in a cache memory in the intermediary network node 103. In this case, the determining unit 701 may also be configured to determine that the user plane traffic flow is to be transmitted over the second transmission path 120 to the intermediary network node 103 based on that the user plane traffic flow is of another type than a real-time communication user plane traffic flow or a live streaming user plane traffic flow using IP header classification. Furthermore, in this case, the determining unit 701 may be configured to determine that the content of the user plane traffic flow indicates that content requested in the user plane traffic flow is content that is cacheable by using Deep Packet Inspection, DPI.

In some embodiments, the determining unit 701 may be configured to determine that the user plane traffic flow is to be transmitted over the second transmission path 120 to the intermediary network node 103 based on that the user plane traffic flow is compressible by a payload compression functionality in the intermediary network node 103. In this case, the determining unit 701 may also be configured to determine that the user plane traffic flow is compressible by determining that the content of the user plane traffic flow is unencrypted using DPI. Furthermore, in this case, the determining unit 701 may be configured to determine that the user plane traffic flow is compressible by determining that the type of the user plane traffic flow is of another type of user plane traffic flow than a real-time communication user plane traffic flow or a live streaming user plane traffic flow, using IP header classification.

In some embodiments, the determining unit 701 may be configured to determine that the user plane traffic flow is to be transmitted over the second transmission path 120 to the intermediary network node 103 based on that the type of the user plane traffic flow is Transport Control Protocol, TCP.

In some embodiments, the determining unit 701 may be configured to determine that the user plane traffic flow is to be transmitted over the second transmission path 120 to the intermediary network node 103 based on the subscription type of the wireless device 121, 122 from which the user plane traffic flow originated.

The first network node 101 also comprises a controlling unit 702, which may also be referred to as a controller or a controlling device or circuitry. The controlling unit 702 is configured to control the user plane traffic flow such that the user plane traffic flow is transmitted over the second transmission path 120 to the intermediary network node 103 in the wireless telecommunications network 100.

The processing circuitry 710 may further comprise a receiver or receiving unit 711 and a transmitter or transmitting unit 712 for receiving/transmitting user plane traffic flows related to a wireless device 121, 122.

The first network node 101 may comprise a processing circuitry 710, which may also be referred to as a processor or a processing unit. The processing circuitry 710 may comprise the determining unit 701 and the controlling unit 702.

The embodiments for controlling user plane traffic flows relating to wireless devices in a wireless telecommunications network 100 may be implemented through one or more processors, such as the processing circuitry 710 in the first network node 101 depicted in FIG. 7, together with computer program code for performing the functions and actions of the embodiments herein. The program code mentioned above may also be provided as a computer program product, for instance in the form of a data carrier carrying computer program code or code means for performing the embodiments herein when being loaded into the processing circuitry 710 in the first network node 101. The computer program code may e.g. be provided as pure program code in the first network node 101 or on a server and downloaded to the first network node 101.

The first network node 101 may further comprise a memory 720 comprising one or more memory units. The memory 720 may be arranged to be used to store data, such as, e.g. the type of subscriptions of the wireless device 121, 122, to perform the methods herein when being executed in the first network node 101.

Those skilled in the art will also appreciate that the processing circuitry 710 and the memory 720 described above may refer to a combination of analog and digital circuits, and/or one or more processors configured with software and/or firmware, e.g. stored in a memory, that when executed by the one or more processors such as the processing circuitry 710 perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

The terminology used in the detailed description of the particular exemplary embodiments illustrated in the accompanying drawings is not intended to be limiting of the described network node 101 and method, which instead are limited by the enclosed claims.

As used herein, the term "and/or" comprises any and all combinations of one or more of the associated listed items.

Further, as used herein, the common abbreviation "e.g.", which derives from the Latin phrase "exempli gratis," may be used to introduce or specify a general example or examples of a previously mentioned item, and is not intended to be limiting of such item. If used herein, the common abbreviation "i.e.", which derives from the Latin phrase "id est," may be used to specify a particular item from a more general recitation. The common abbreviation "etc.", which derives from the Latin expression "et cetera" meaning "and other things" or "and so on" may have been used herein to indicate that further features, similar to the ones that have just been enumerated, exist.

As used herein, the singular forms "a", "an" and "the" are intended to comprise also the plural forms as well, unless expressly stated otherwise. It will be further understood that the terms "includes," "comprises," "including" and/or "comprising," when used in this specification, specify the presence of stated features, actions, integers, steps, operations, elements, and/or components, but do not preclude the presence or addition of one or more other features, actions, integers, steps, operations, elements, components, and/or groups thereof.

Unless otherwise defined, all terms comprising technical and scientific terms used herein have the same meaning as commonly understood by one of ordinary skill in the art to which the described embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments herein are not limited to the above described preferred embodiments. Various alternatives, modifications and equivalents may be used. Therefore, the above embodiments should not be construed as limiting.

The invention claimed is:

1. A method performed by a first network node for controlling user plane traffic flows relating to wireless devices in a wireless telecommunications network, the first network node being configured to transmit the user plane traffic flows over a first transmission path to a second network node in the wireless telecommunications network, the method comprising:
   determining that the user plane traffic flow is to be transmitted over a second transmission path to an intermediary network node configured to communicate with the first and second network nodes in the wireless telecommunications network based on one or more of the type of the user plane traffic flow, the wireless device related to the user plane traffic flow, and the content of the user plane traffic flow; and
   controlling the user plane traffic flow such that the user plane traffic flow is transmitted over the second transmission path to the intermediary network node in the wireless telecommunications network; and
   wherein the determining that the user plane traffic flow is to be transmitted over the second transmission path to the intermediary network node is based on the user plane traffic flow being compressible by a payload compression functionality in the intermediary network node.

2. The method according to claim 1, wherein the determining further comprises determining that the user plane traffic flow is to be transmitted over the second transmission path to the intermediary network node based on that the content of the user plane traffic flow indicates that content requested in the user plane traffic flow is content that is cacheable in a cache memory in the intermediary network node.

3. The method according to claim 1, wherein the determining further comprises determining that the content of the user plane traffic flow is unencrypted by using Deep Packet Inspection, DPI.

4. The method according to claim 1, wherein the determining further comprises determining that the user plane traffic flow is of another type than a real-time communication user plane traffic flow or a live streaming user plane traffic flow, by using Internet Protocol, IP, header classification.

5. The method according to claim 1, wherein the determining further comprises determining that the user plane traffic flow is to be transmitted over the second transmission path to the intermediary network node based on that the type of the user plane traffic flow is Transport Control Protocol, TCP.

6. The method according to claim 1, wherein the determining further comprises determining that the user plane traffic flow is to be transmitted over the second transmission path to the intermediary network node based on the subscription type of the wireless device to which the user plane traffic flow is related.

7. A first network node for controlling user plane traffic flows relating to wireless devices in a wireless telecommunications network, the first network node being configured to transmit the user plane traffic flows over a first transmission path to a second network node in the wireless telecommunications network, the first network node comprising:
processing circuitry configured to:
determine that the user plane traffic flow is to be transmitted over a second transmission path to an intermediary network node configured to communicate with the first and second network nodes in the wireless telecommunications network based on one or more of the type of the user plane traffic flow, the wireless device related to the user plane traffic flow, and the content of the user plane traffic flow;
control the user plane traffic flow such that the user plane traffic flow is transmitted over the second transmission path to the intermediary network node in the wireless telecommunications network; and
wherein the processing circuitry is configured to determine that the user plane traffic flow is to be transmitted over the second transmission path to the intermediary network node based on that the user plane traffic flow is compressible by a payload compression functionality in the intermediary network node.

8. The first network node according to claim 7, wherein the processing circuitry is further configured to determine that the user plane traffic flow is to be transmitted over the second transmission path to the intermediary network node based on that the content of the user plane traffic flow indicates that content requested in the user plane traffic flow is content that is cacheable in a cache memory in the intermediary network node.

9. The first network node according to claim 7, wherein the processing circuitry is further configured to determine that the user plane traffic flow is compressible by determining that the content of the user plane traffic flow is unencrypted using Deep Packet Inspection, DPI.

10. The first network node according to claim 7, wherein the processing circuitry is further configured to determine that the user plane traffic flow is compressible by determining that the type of the user plane traffic flow is of another type of user plane traffic flow than a real-time communication user plane traffic flow or a live streaming user plane traffic flow, using Internet Protocol, IP, header classification.

11. The first network node according to claim 7, wherein the processing circuitry is further configured to determine that the user plane traffic flow is to be transmitted over the second transmission path to the intermediary network node based on that the type of the user plane traffic flow is Transport Control Protocol, TCP.

12. The first network node according to claim 7, wherein the processing circuitry is further configured to determine that the user plane traffic flow is to be transmitted over the second transmission path to the intermediary network node based on the subscription type of the wireless device to which the user plane traffic flow is related.

13. The first network node according to claim 7, wherein the intermediary network node is a Radio Network Controller, RNC, and
wherein the first network node is an eNodeB and the second network node is a Serving Gateway, SGW, or vice versa.

14. The first network node according to claim 7, wherein the intermediary network node is a Service Aware Proxy, SAP, and
wherein the first network node is a Packet Data Network Gateway, PGW, and the second network node is a core network routing node, or vice versa.

15. The first network node according to claim 7, wherein the intermediary node is a stand-alone routing node, and wherein the first network node and the second network node are one of the following combinations:
a Packet Data Network Gateway, PGW, and a Service Aware Proxy, SAP;
a eNodeB and a Serving Gateway, SGW;
a Radio Network Controller, RNC, and a Serving Gateway, SGW; or
a WiFi Access Point/Controller, WiFi AP/AC, and a PGW.

* * * * *

UNITED STATES PATENT AND TRADEMARK OFFICE
CERTIFICATE OF CORRECTION

PATENT NO. : 10,153,975 B2  
APPLICATION NO. : 14/767648  
DATED : December 11, 2018  
INVENTOR(S) : Persson et al.

Page 1 of 2

It is certified that error appears in the above-identified patent and that said Letters Patent is hereby corrected as shown below:

In the Specification

In Column 5, Line 35, delete "eNodeB 110" and insert -- eNodeB 201 --, therefor.

In Column 5, Lines 54-55, delete "wireless telecommunications network 100." and insert -- wireless telecommunications network 200. --, therefor.

In Column 5, Lines 57-58, delete "wireless telecommunications network 300." and insert -- wireless telecommunications network 200. --, therefor.

In Column 6, Line 11, delete "wireless telecommunications network 100." and insert -- wireless telecommunications network 200. --, therefor.

In Column 6, Lines 12-13, delete "wireless telecommunications network 100" and insert -- wireless telecommunications network 200 --, therefor.

In Column 8, Line 45, delete "SOW 420" and insert -- SGW 420 --, therefor.

In Column 9, Line 25, delete "PGW 401," and insert -- PGW 401. --, therefor.

In Column 10, Line 20, delete "intermediary network node 103" and insert -- intermediary network node 102 --, therefor.

In Column 10, Line 23, delete "intermediary network node 103" and insert -- intermediary network node 102 --, therefor.

In Column 10, Line 24, delete "first and second network nodes 101, 102" and insert -- first and second network nodes 101, 103 --, therefor.

Signed and Sealed this  
Sixteenth Day of February, 2021

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 10,153,975 B2

In Column 10, Line 42, delete "intermediary network node 103" and insert -- intermediary network node 102 --, therefor.

In Column 11, Line 36, delete "IF addresses" and insert -- IP addresses --, therefor.

In Column 14, Line 6, delete "intermediary network node 103" and insert -- intermediary network node 102 --, therefor.

In Column 14, Line 9, delete "intermediary network node 103" and insert -- intermediary network node 102 --, therefor.

In Column 14, Lines 10-11, delete "first and second network nodes 101, 102" and insert -- first and second network nodes 101, 103 --, therefor.

In Column 14, Line 15, delete "intermediary network node 103" and insert -- intermediary network node 102 --, therefor.

In Column 14, Line 18, delete "intermediary network node 103." and insert -- intermediary network node 102. --, therefor.

In Column 14, Lines 21-22, delete "intermediary network node 103" and insert -- intermediary network node 102 --, therefor.

In Column 14, Line 33, delete "intermediary network node 103" and insert -- intermediary network node 102 --, therefor.

In Column 14, Line 35, delete "intermediary network node 103." and insert -- intermediary network node 102. --, therefor.

In Column 14, Line 49, delete "intermediary network node 103" and insert -- intermediary network node 102 --, therefor.

In Column 14, Line 54, delete "intermediary network node 103" and insert -- intermediary network node 102 --, therefor.

In Column 14, Line 62, delete "intermediary network node 103" and insert -- intermediary network node 102 --, therefor.

In Column 15, Line 50, delete ""exempli gratis,"" and insert -- "exempli gratia," --, therefor.